(12) United States Patent
Richman

(10) Patent No.: US 7,165,121 B2
(45) Date of Patent: Jan. 16, 2007

(54) COMBINED MULTIMEDIA AND DATA NETWORK

(75) Inventor: Russell M. Richman, Schnecksville, PA (US)

(73) Assignee: Agere Systems, Inc., Allentown, PA (US)

( * ) Notice: Subject to any disclaimer, the term of this patent is extended or adjusted under 35 U.S.C. 154(b) by 431 days.

(21) Appl. No.: 09/860,281

(22) Filed: May 17, 2001

(65) Prior Publication Data
US 2002/0174250 A1 Nov. 21, 2002

(51) Int. Cl.
*G06F 15/16* (2006.01)
(52) U.S. Cl. ................................................. 709/250
(58) Field of Classification Search ................ 710/305, 710/313, 314, 300, 105; 709/249, 250
See application file for complete search history.

(56) References Cited

U.S. PATENT DOCUMENTS 6,633,547 B1 * 10/2003 Akatsu et al. .............. 370/255
6,647,447 B1 * 11/2003 Kou ........................... 710/100

OTHER PUBLICATIONS http://www.ieee802.org/802_tutorials/nov98/1394IV_1198.pdf.*
http://www.ieee802.org/802_tutorials/nov98/1394III_1198.pdf.*
http://www.ieee802.org/802_tutorials/nov98/.*
http:www.ieee802.org/802_tutorials/nov98/1394.html.*
"Firewire—IEEE 1394" by William Abraham, Mar. 1, 2000 http://users.rowan.edu/~shreek/spring00/frontiers/presentations/firewire/ppt.*

* cited by examiner

*Primary Examiner*—Henry W. H. Tsai
*Assistant Examiner*—David Martinez

(57) ABSTRACT

A combined multimedia and data network system is usable with at least one asynchronous device and at least one isochronous device. The system includes a target system having first and second network environments. A multiwire cable is connected to the target system. A connection system is coupled to the cable. The connection system has a single unit containing a plurality of hubs and a plurality of bridges. Each of the network environments is coupled to a respective one of the hubs and a respective one of the bridges. The cable carries data and multimedia signals in the first and second network environments in parallel from the target system to the first and second connection devices, respectively.

13 Claims, 3 Drawing Sheets

COMBINED MULTIMEDIA AND DATA NETWORK

FIELD OF THE INVENTION

The invention relates to network system architecture, and more particularly to combined multimedia and data transmission network systems.

BACKGROUND OF THE INVENTION

Data transmission within a network, such as that which is associated with personal computers, is typically performed in an asynchronous environment. Asynchronous operation proceeds independently of a timing mechanism such as a clock, allowing data integrity and accuracy to take priority over speed and timing. Accordingly, in asynchronous operation, real-time or virtual transmission may not take place. Unlike data transmission, multimedia transmission is performed in an isochronous environment to provide virtual functionality. Isochronous operation is time-sensitive, accomplishing real-time transmission at the expense of accuracy and integrity if necessary.

Present solutions to combine isochronous systems with synchronous systems have significant limitations. Software drivers have been devised to provide virtual multimedia on existing data networks which move data at a fast enough rate to remain in sequence. If there is heavy traffic on the system, however, data may not arrive in the desired time frame and virtual functionality may be lost. Separate cables and system components may also be installed to provide isochronous operating capabilities within an asynchronous network system. Use of separate cable systems to provide isochronous and asynchronous capabilities is costly. Accordingly, there is a need for a network system having both data and multimedia capabilities.

SUMMARY OF THE INVENTION

Embodiments of the invention include a combined multimedia and data network system for use with at least one asynchronous device and at least one isochronous device. The combined multimedia and data network system includes a target system having a first network environment and a second network environment. A multiwire cable is connected to the target system. A connection system is coupled to the cable wherein the connection system includes a first connection device to receive signals in the first network environment and a second connection device to receive signals in the second network environment. The multiwire cable carries data and multimedia signals in the first and second network environments in parallel from the target system to the first and second connection devices, respectively. The multimedia and data network system is particularly applicable when combining Ethernet and 1394B environments (IEEE standards for contention networks and nonproprietary, high-speed, serial bus input/outputs, respectively.

Further disclosed is a cable system and a method of combining network environments.

DESCRIPTION OF THE DRAWINGS

The invention is best understood from the following detailed description when read with the accompanying drawing.

DETAILED DESCRIPTION OF THE INVENTION

A combined multimedia and data network system is disclosed that may be implemented over wiring currently used primarily for data transmission. Unlike many existing systems, embodiments of the invention may provide true multimedia, even during heavy network traffic. The combined network system may easily be expanded by incrementally adding devices.

According to embodiments of the invention, data and multimedia traffic may be carried through the system simultaneous without the need for separate cable systems and/or separate network hardware. Asynchronous data transmission devices may be run in parallel with isochronous devices through a single cable system. Asynchronous devices may include for example, personal computers. Illustrative examples of isochronous devices that may be incorporated into embodiments of the invention include music or video devices, such as stereo, digital video disc (DVD), camcorder, video cassette recorder (VCR), compact disc (CD) changer, television and cable set top box. It is also possible to have a single device that contains both asynchronous and isochronous technologies.

Signals from the asynchronous and isochronous devices are transmitted through a cable system. The signals are received at corresponding asynchronous and isochronous connection devices or connection devices that are compatible with a network environment capable of handling asynchronous and isochronous transmissions. The cable system is made up, at least in part, of one or more cables that comprise multiple wires wherein a portion of the wires carries signals in a first network environment and a portion of the wires carries isochronous signals in a second network environment. For example, a CAT5 cable (terminology as used by the American National Standards Institute/Electronic Industries Association) may be used which will have one or more inner, and one or more outer twisted pairs of wires wherein the outer pairs carry multimedia signals and the inner pairs carry data transmission signals.

In an illustrative embodiment of the invention, the asynchronous device(s) operates in an Ethernet environment or similar, and the isochronous device(s) operates in a 1394B environment or similar. Any environments may be used that are compatible with the devices and provide the desired asynchronous or isochronous technology. An environment may be asynchronous, isochronous or combine the two technologies.

Figure 1:
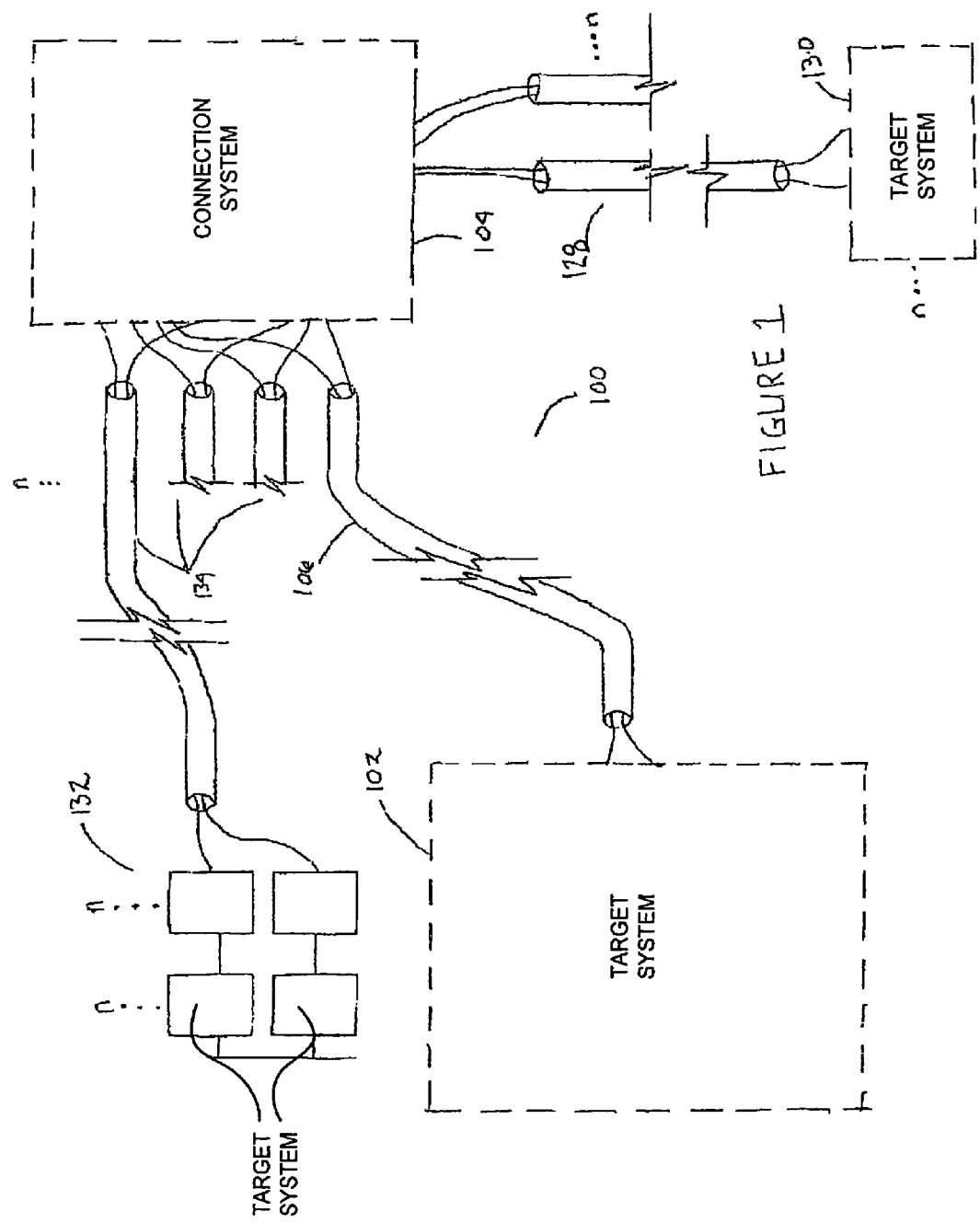
FIG. 1 depicts a combined data transmission and multimedia network system according to an embodiment of the invention.

FIG. 1 depicts a combined data transmission and multimedia network system 100 according to an illustrative embodiment of the invention.

Figure 2:
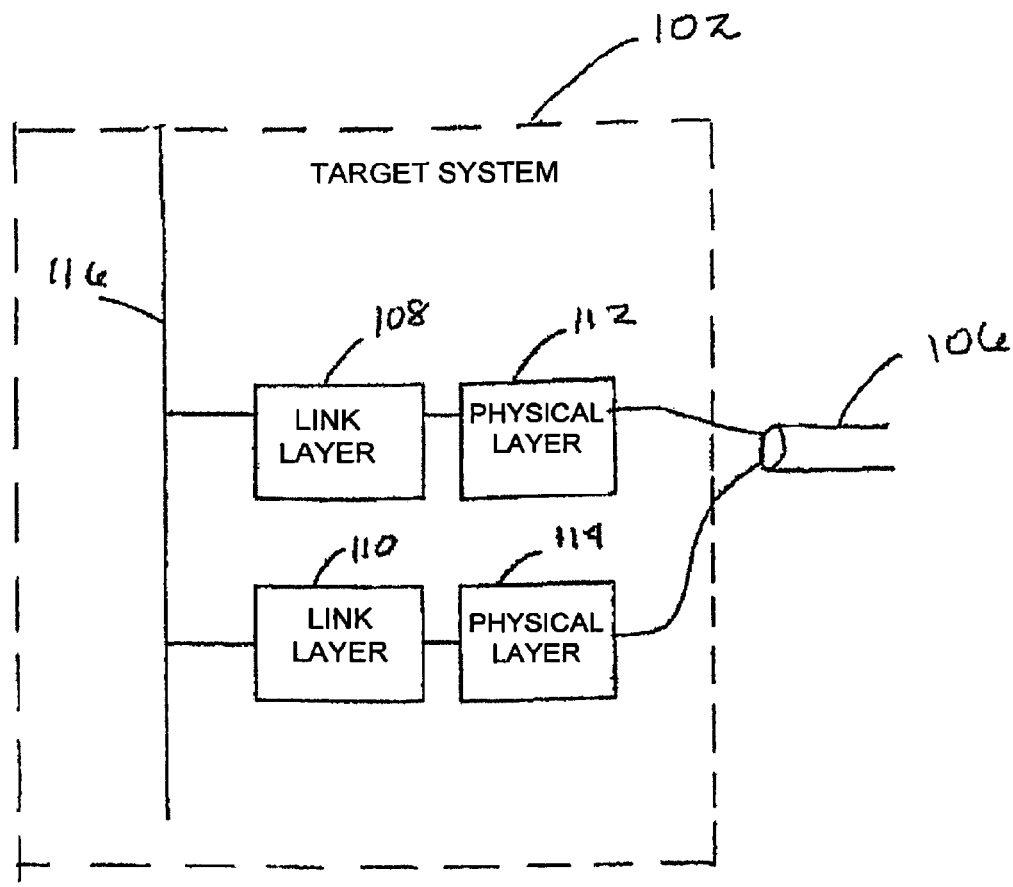
FIG. 2 depicts a target system according to an illustrative embodiment of the invention.

A target system 102 is electrically connected to a connection system 104 by a cable 106. Target system 102 may include one or more network environments compatible with isochronous or asynchronous technologies or a combination thereof. An illustrative embodiment of target system 102 is depicted in FIG. 2. In this embodiment target system 102 comprises two or more physical layers 112 and 114, for example, a 1394B physical layer and an Ethernet physical layer. Multimedia network system 100 may include n target systems 132. The value of n is limited by the applicable bus standard, such as 1394B or Ethernet. Each target system 132 is connected by a cable 134, such as a CAT5 cable, to connection system 104. Returning to FIG. 1, physical layers 112 and 114 are connected to link layers 108 and 110 specific to their environment. In an illustrative embodiment, the Ethernet physical layer is connected to an Ethernet media access control layer and the 1394B physical layer is connected to a 1394B link. Link layers 108 and 110 are connected to a local bus 116. Local bus 116 is of a type that permits communication between peripheral devices and portions of system 100. Specific system component types used determine the number of peripheral devices that may be used. Illustrative examples of local buses are a peripheral component interconnect (PCI) bus and small form factor bus such as a PCMCIA or cardbus. Local bus 116 is connected to links 108 and 110.

Figure 3:
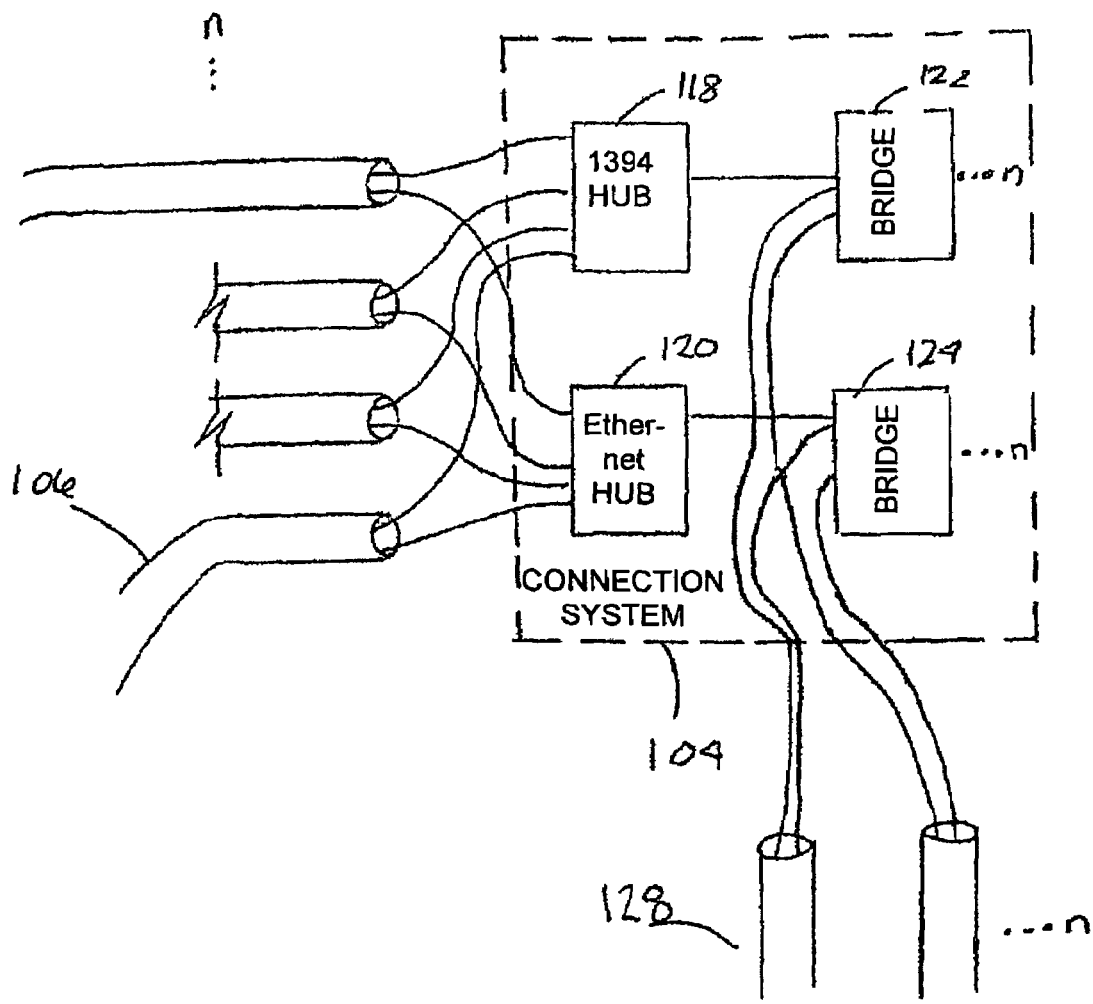
FIG. 3 depicts a connection system according to an illustrative embodiment of the invention.

Signals from physical layers 112 and 114 are carried through cable 106 to connection system 104. Cable 106 is capable of transmitting signals in the network environments of target system 102. Connection system 104 may comprise, one or more connection devices such as hubs, switches, bridges or a combination thereof. The connection devices may connect networks to allow information to pass from one to another, or join lines within a network. FIG. 3 depicts an illustrative embodiment of connection system 104. In this embodiment connection system 104 comprises a hub 118 and 120 for each environment, for example a 1394B hub and an Ethernet hub. FIG. 3 further depicts bridges 122 and 124 which may be included in the system to expand the capabilities by connecting two or more networks. The networks may be, for example, additional Ethernet or 1394B networks. One or more additional target systems 130 may be networked via additional cables 128.

While the invention has been described by illustrative embodiments, additional advantages and modifications will occur to those skilled in the art. Therefore, the invention in its broader aspects is not limited to specific details shown and described herein. Modifications, for example, to the number and types of electronic devices and cables, and specific network environment, may be made without departing from the spirit and scope of the invention. Accordingly, it is intended that the invention not be limited to the specific illustrative embodiments but be interpreted within the full spirit and scope of the appended claims and their equivalents.

The invention claimed is:

1. A combined multimedia and data network system for use with at least one asynchronous device and at least one isochronous device, the combined multimedia and data network system comprising:
   a plurality of target systems, each comprising an Ethernet network environment and a 1394 network environment;
   a respective multiwire cable connected to each target system;
   a connection system coupled to the cables, the connection system comprising a single unit containing an Ethernet hub, a first bridge connected to the Ethernet hub, a 1394 hub, and a second bridge connected to the 1394 hub, each of the Ethernet network environment and 1394 network environment being coupled to a respective one of the Ethernet hub and the 1394 hub;
   wherein the multiwire cables carry data and multimedia signals in the Ethernet network environment and the 1394 network environment in parallel from the target systems to the Ethernet hub and the 1394 hub respectively.

2. The system of claim 1 wherein the cable is CAT 5.

3. The system of claim 1 wherein the combined multimedia and data network system is coupled to one or more personal computers.

4. The system of claim 1 wherein the combined multimedia and data network system is coupled to one or more isochronous devices selected from the group consisting of audio receiver, audio player, DVD, camcorder, VCR, CD changer, television and cable set top box.

5. The system of claim 1 further comprising one or more additional connection devices.

6. The system of claim 5 wherein the additional connection devices are selected from the group consisting of a bridge, a hub and a switch.

7. The system of claim 1 further comprising one or more additional target systems wherein the additional target systems comprise the Ethernet network environment, the 1394 network environment or a combination thereof, and the one or more additional target systems are connected to the connection system by one or more additional cables.

8. The system of claim 1 wherein the target system comprises:
   a physical layer for each network environment;
   a link layer for each network environment; and
   a local bus;
   wherein the local bus receives signals in each network environment from a plurality of peripheral devices and provides the signals to the corresponding link layer, and the link layer provides signals to the corresponding physical layers.

9. A method of combining network environments to provide multimedia and data signal transmission, the method comprising:
   carrying signals from two or more network environments in parallel from a target system to a plurality of connection devices using a combined multimedia and data network system as described in claim 1.

10. A multiwire cable system for use with a combined multimedia and data network system having at least one asynchronous device and at least one isochronous device according to claim 1, wherein the multiwire cable carries data and multimedia signals in the Ethernet network environment and the 1394 network environment in parallel.

11. The cable system of claim 10 wherein the multiwire cable carries the data and multimedia signals from a target system to a first and a second connection device.

12. The cable system of claim 10 wherein the cable is CAT 5.

13. The system of claim 1, further comprising:
   an additional cable carrying both Ethernet signals and 1394 signals; and
   at least one additional target system connected to the first bridge and the second bridge additional cable carrying Ethernet signals and 1394 signals.

* * * * *